Dec. 17, 1963  J. R. WEST  3,114,481
SPREADER MARKER
Filed March 24, 1960  6 Sheets-Sheet 1
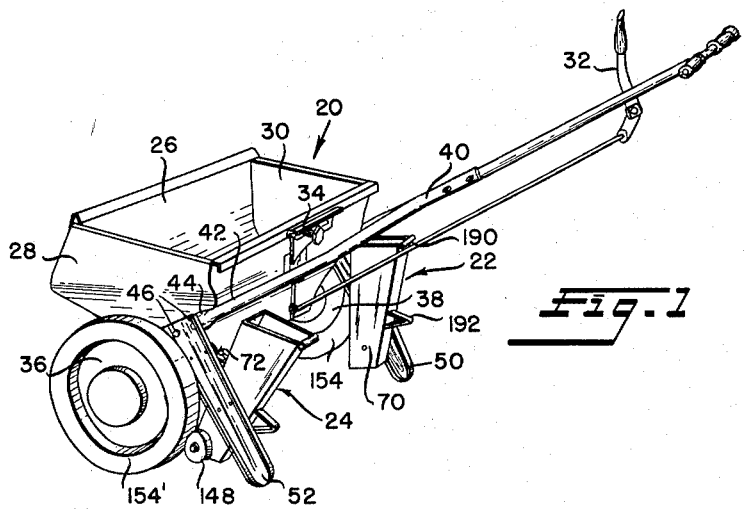
INVENTOR
John R. West
BY Strauch, Nolan + Neale
ATTORNEYS

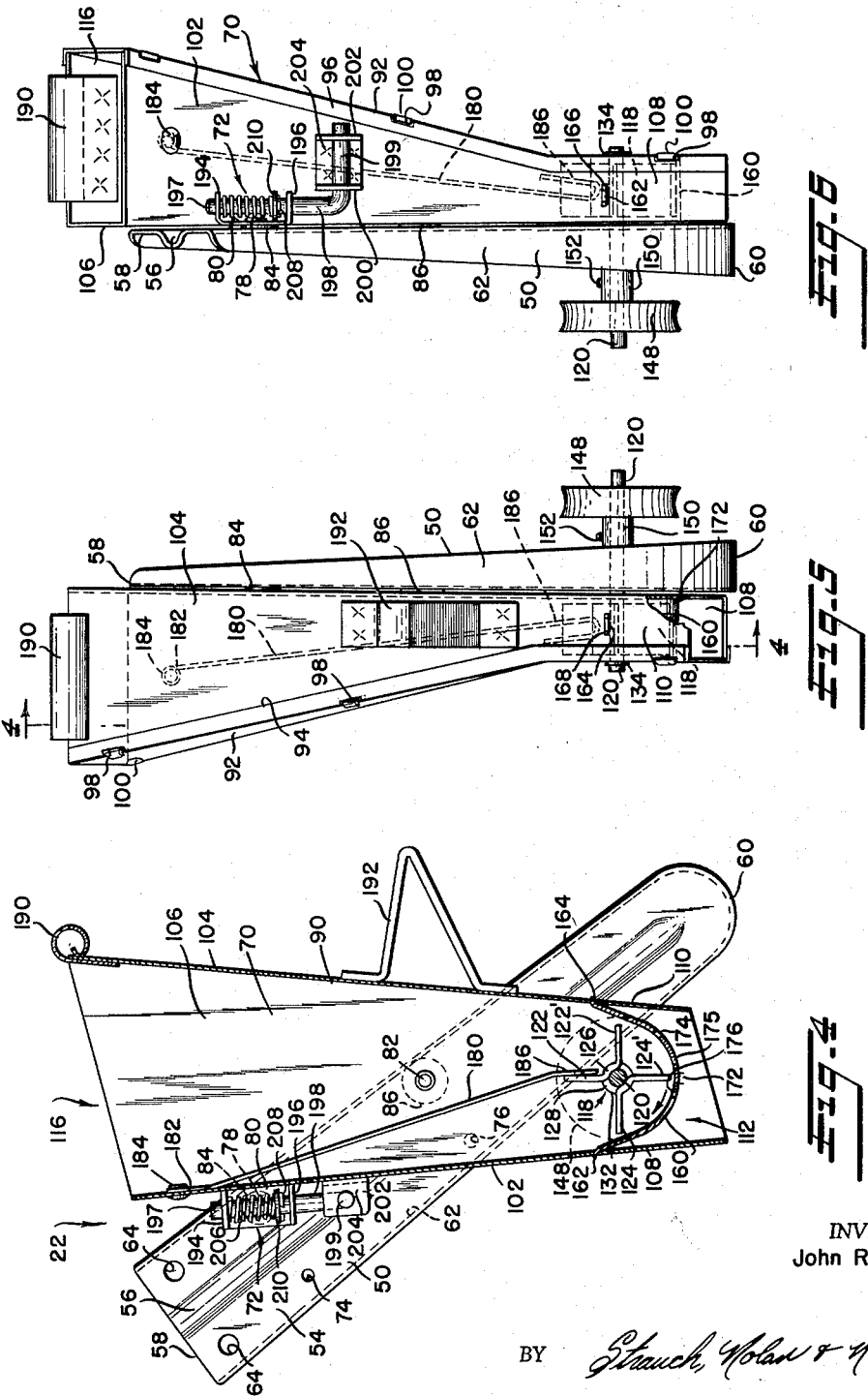

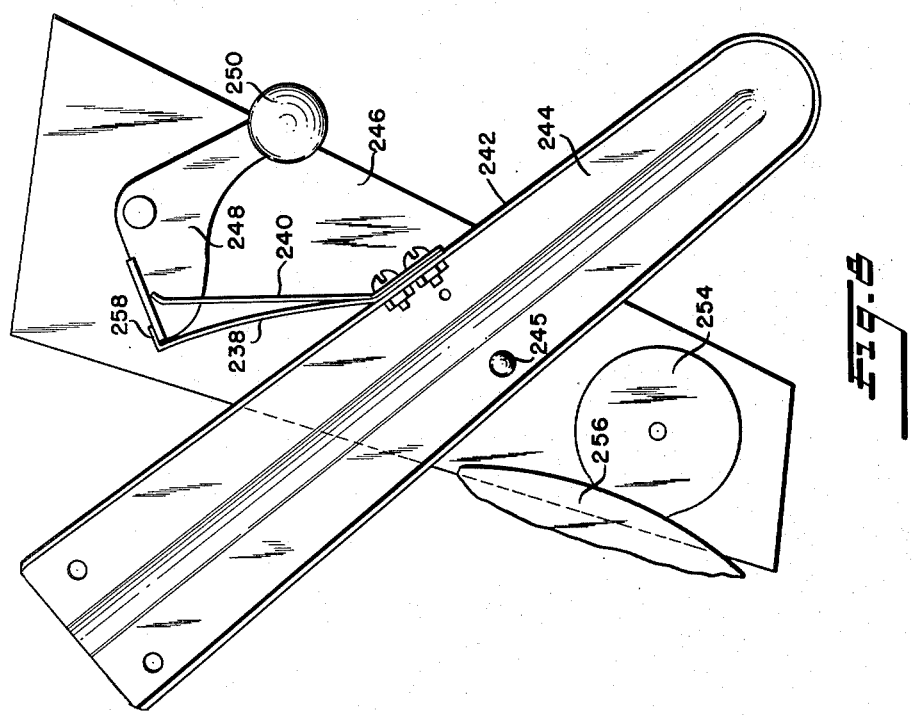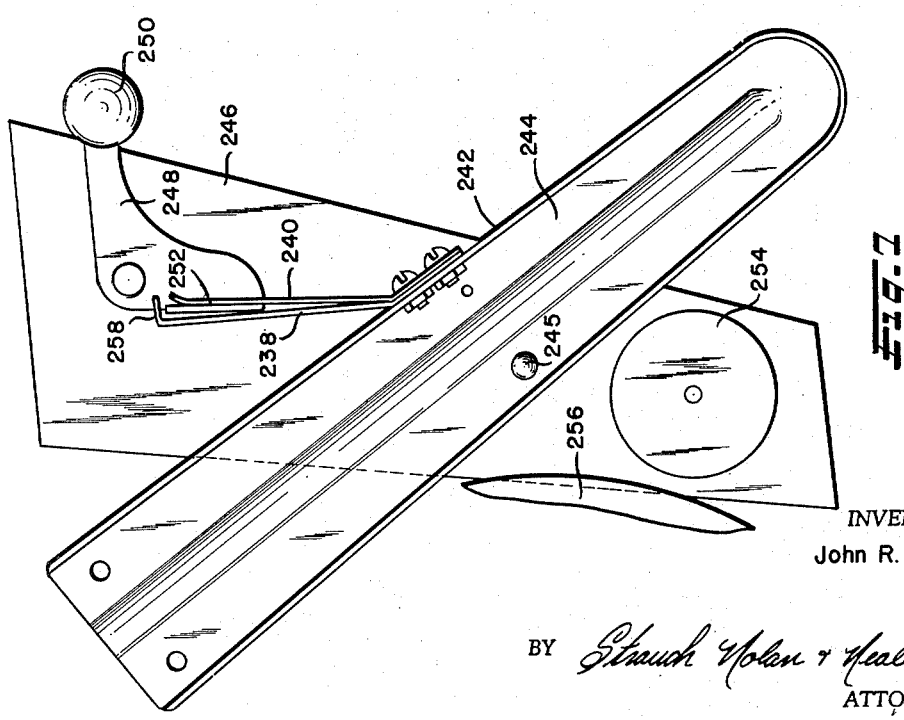

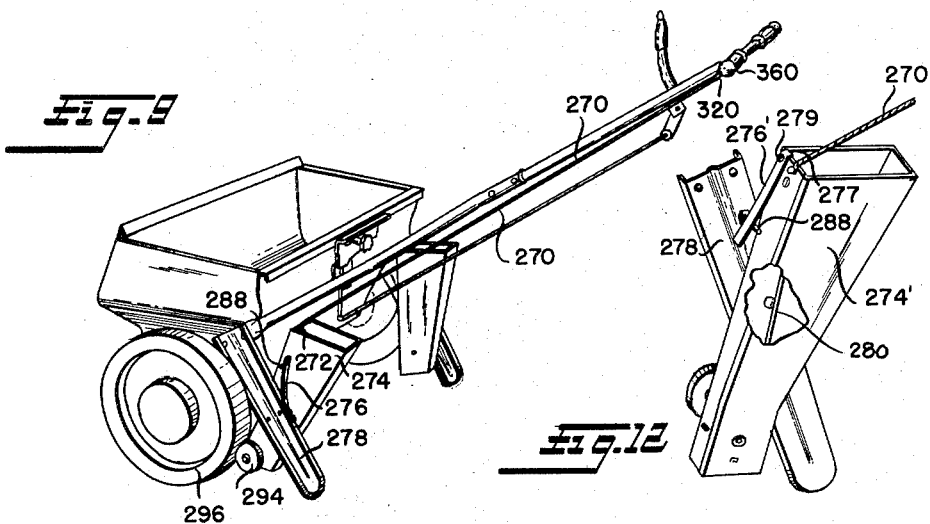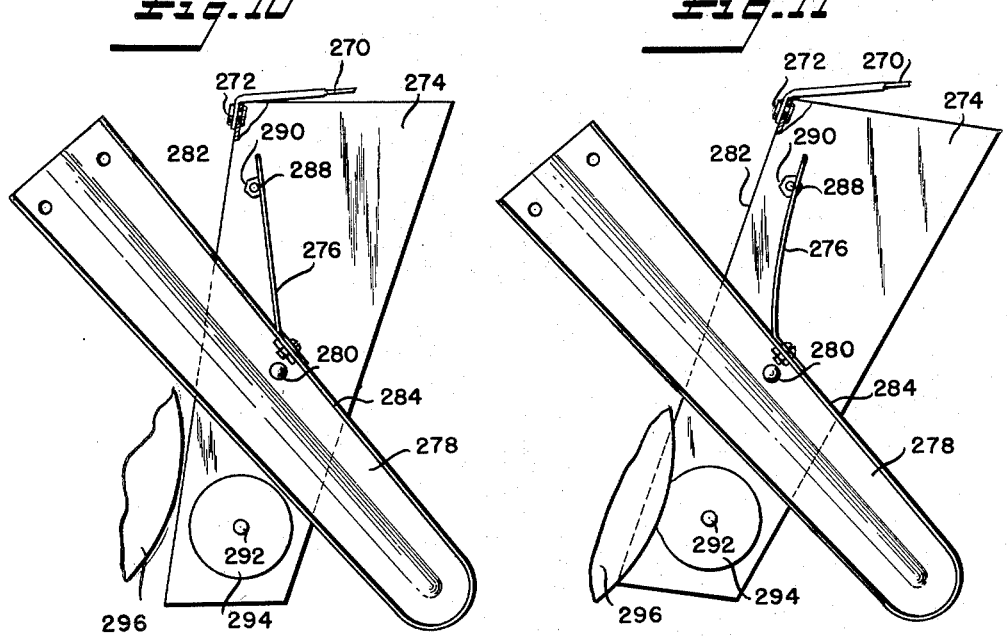

Dec. 17, 1963     J. R. WEST     3,114,481
SPREADER MARKER
Filed March 24, 1960     6 Sheets—Sheet 5
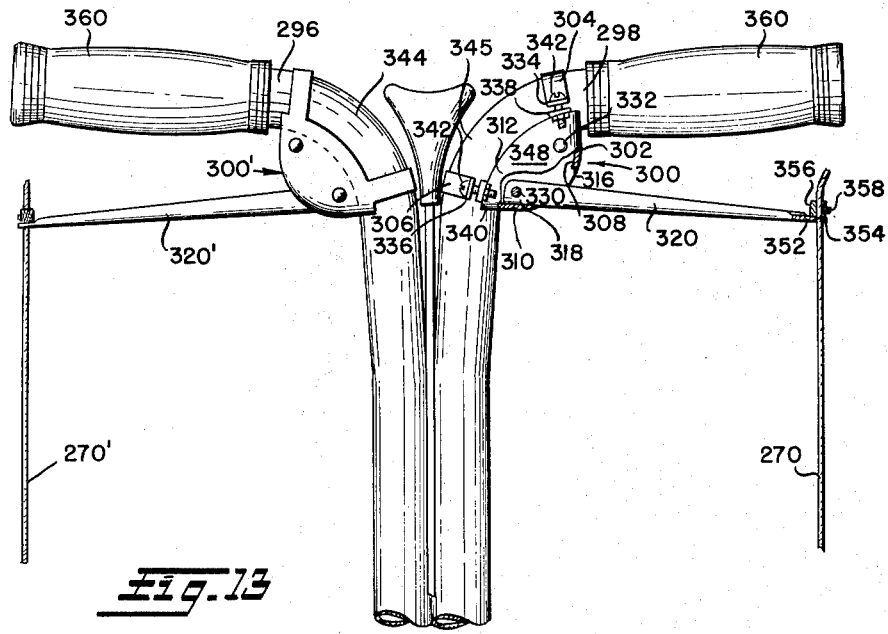
Fig. 13
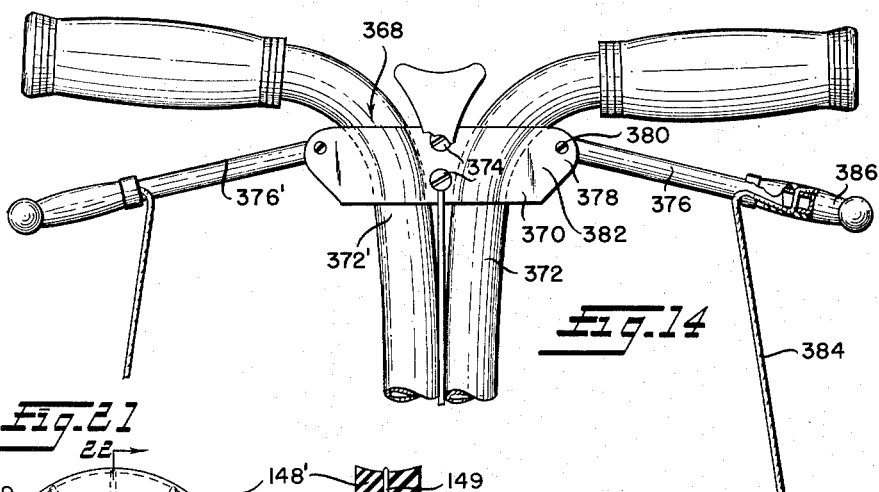
Fig. 14
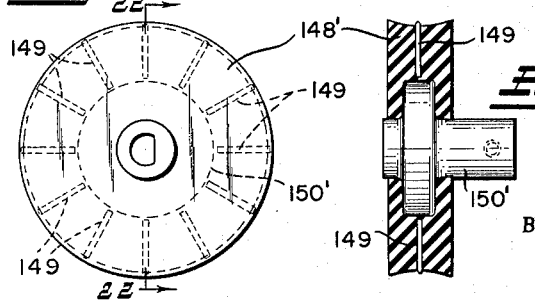
Fig. 21
Fig. 22
INVENTOR
John R. West
BY *Strauch, Nolan & Neale*
ATTORNEYS Dec. 17, 1963 J. R. WEST 3,114,481
SPREADER MARKER
Filed March 24, 1960 6 Sheets-Sheet 6
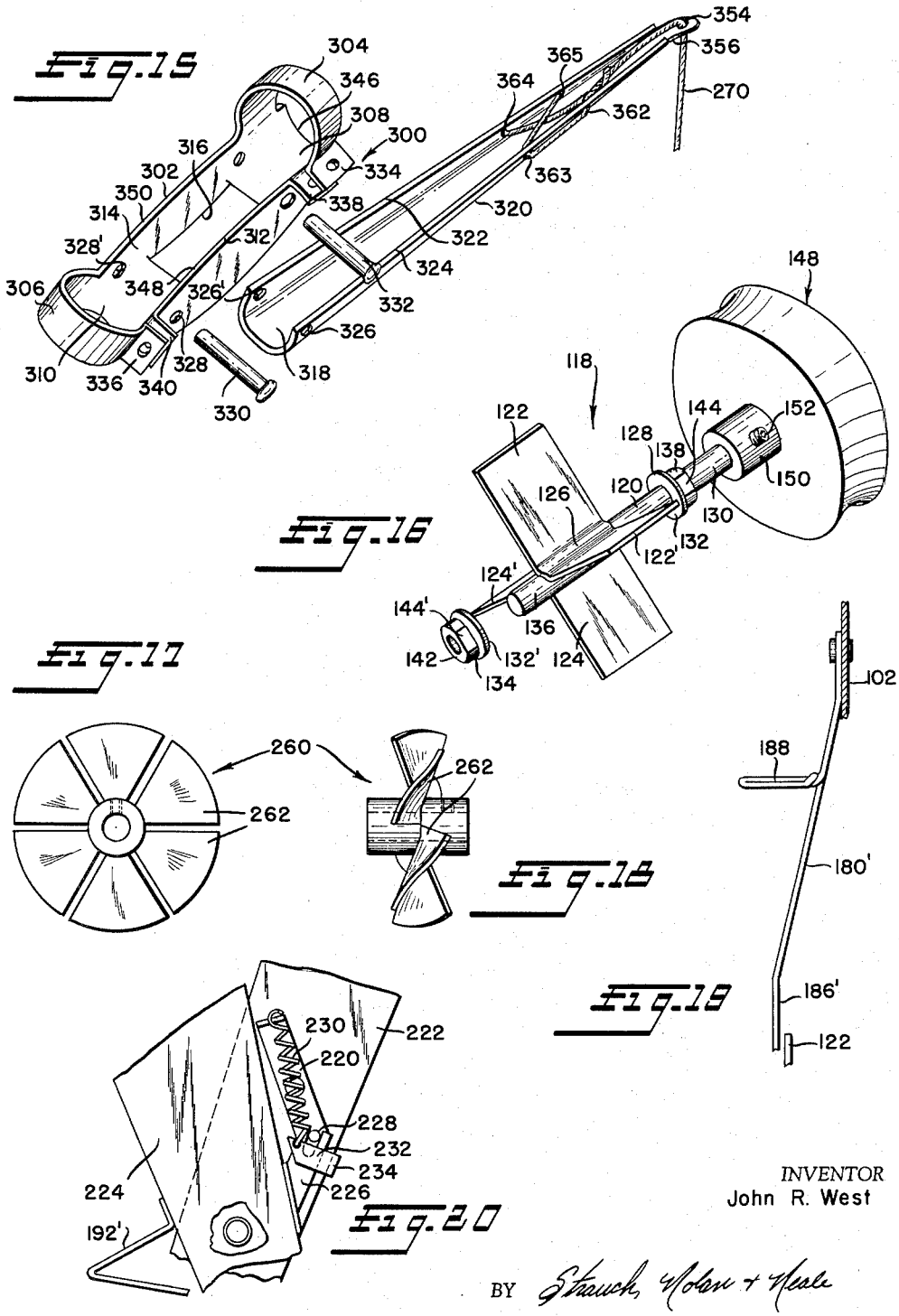
INVENTOR
John R. West
ATTORNEY

United States Patent Office 3,114,481
Patented Dec. 17, 1963

3,114,481
SPREADER MARKER
John R. West, Marysville, Ohio, assignor to The O. M. Scott & Sons Company, Marysville, Ohio, a corporation of Ohio
Filed Mar. 24, 1960, Ser. No. 17,382
29 Claims. (Cl. 222—138)

This invention relates to marking devices for use on material distributor spreaders, commonly referred to as lawn spreaders. More particularly this invention relates to hopper type controllable marking devices which are mounted on lawn spreaders and dispense marking material onto the turf along the edge of the material being dispensed by the lawn spreader.

The need for a reliable lawn spreader marking device is coupled with the problem of developing lawn spreaders capable of applying material at accurate discharge rates. With the advent of modern high analysis grass foods, herbicides, fungicides and pesticides it has become essential that spreaders be developed which will make accurate application at extremely low application rates. The faulty application of high analysis fertilizers can result in lawns being streaked by over-application or under-application (which in essence is lack of application).

It has therefore become highly desirable, if not essential, that a means of marking the exact edge of the material being applied by the spreader be devised to provide a visual means to aid in avoiding the possibility of missing strips of turf or overlapping and applying material at excessive rates on overlapped portions of the turf. The application of the marking line must be at the exact edge of the material to avoid any overlap or missed strips so that the operator of the spreader does not have to depend upon his guess as to how much the wheels of the spreader should overlap in order to obtain complete coverage. Applying material to the tips of the blades of grass in the form of a dust or marking compound is the only manner in which a marking line on all types of turf can be seen with assurance by the spreader operator.

The distribution of a minute quantity of dust on the tips of the blades of grass requires that the dust or powder leave the marking device in minute quantities. Such powders, however, are difficult to distribute due to their packing and bridging in a distributing device.

To solve these problems, this present invention includes a unique marker hopper device, with high speed rotor giving a blower-like fan action in conjunction with a vibrator device to keep the powdery marking material from bridging over the fan rotor and for maintaining a flowing action of the material down into the path of the blower. Use of a blower fan poses further problems. Since many granular lawn materials must be applied to damp turf for effective action it was necessary that an economical means of driving the blower fan be developed which does not slip or skid when it becomes wet and coated with the wet dust from the soil or from the material being applied with the spreader. The squeegee action of a live rubber wheel against the spreader wheel provides this action. Hardened steel tines can be molded into the rubber drive to provide additional traction, particularly when the spreader wheel is not wet. A constant high coefficient of friction is maintained between this marker drive-wheel device and the spreader wheel when the marking device is operating. For rapid selective operation, an over-center spring tension device has been developed as part of the present invention to hold the marking device in either an "on" or "off" position as desired by the operator. For hand operation, a cable pull device is connected to a marker hopper which is spring biased to the "off" position. Another important feature of the present marker invention is its economy, both from the standpoint of manufacture and operation.

Accordingly, a primary object of the present invention resides in the provision of a novel lawn spreader marking device, for attachment to conventional material distribution spreaders, and including a selectively operable "on"-"off" control mechanism.

Another object resides in the provision of a lawn spreader of the wheeled hopper type in which the support legs provide bracket mounts for right and left hand blower type marker devices having mechanism enabling selective positioning of either device to its "on" or "off" position.

A further object resides in the provision of a wheeled hopper type lawn spreader with right and left hand blower type marker devices adapted to be selectively operated by pivotal shifting of a blower drive wheel into engagement with an associated spreader wheel. In conjunction with the preceding object a further object resides in providing each marker device with a resiliently biased mechanism connected between the pivotable marker devices and their support brackets and with convenient controls by which an operator can manipulate the devices independently to either an "off" or "on" position by using his foot.

Still another object resides in the provision, on a wheeled lawn spreader, of right and left hand hopper type blower discharge marking devices, each of which is pivotally mounted at one side of the spreader, has an independent friction type drive wheel adapted to be placed in drive engagement with an associated one of the spreader wheels upon controlled pivotal movement of the marker device, is resiliently biased to an "off" position and has a hand lever control enabling the spreader operator to selectively pivot either marker device against its resilient bias to place its drive wheel into drive engagement with its associated spreader wheel.

A still further object resides in the provision of a novel spreader marker device consisting of a narrow and vertically elongated hopper connected to a bracket for fore and aft pivotal shift on a horizontal axis the lower end of the hopper constituting a blower chamber with an open upper end in direct communication with the upper confines of the hopper and having a curved lower wall with several discharge apertures, a blower fan on a shaft journalled in plastic bearings in the walls of the blower chamber, the shaft projecting beyond the hopper and parallel to the hopper pivot axis and having secured thereon a high friction type of drive wheel, a resilient biasing means coacting with the hopper to urge the hopper in a pivotal shift in at least one direction about its pivot axis, and an agitator in the hopper extending upwardly from the blower fan.

In conjunction with the preceding object, still another object resides in the use of a planar stamped sheet metal spreader leg as a bracket for mounting the marker hopper, the leg being made to be secured against the side end wall of a spreader hopper and fastened in a vertical planar disposition so the marker hopper will be placed with its lower end discharge immediately behind the side edge of the spreader hopper.

A still further object resides in the provision of low friction bearing materials made of corrosion resistant plastic at pivotal pairings of the links constituting the selectively operable marker device.

A further object resides in the provision of a novel low-cost handle lever assembly made from stamped sheet metal components.

Further novel features and other objects of this invention will become apparent from the following detailed description, discussion and the appended claims taken in conjunction with the accompanying drawings showing a preferred structure and embodiment, in which:

FIGURE 1 is a perspective rear quarter view illustrating a lawn spreader equipped with right-hand and left-hand marker devices according to one embodiment of the present invention;

FIGURE 2 is an enlarged side elevation of a right-hand marker device as shown in FIGURE 1 illustrating the hopper in an "off" position;

FIGURE 3 is a side elevation view similar to FIGURE 2 but illustrating the hopper in its "on" position;

FIGURE 4 is a still further enlarged side elevation of the right-hand marker device (of FIGURES 1, 2 and 3) with the side cover plate of the hopper broken away to show interior details;

FIGURE 5 is a rear elevation of the marker device of FIGURE 4;

FIGURE 6 is a front elevation of the marker device of FIGURE 4;

FIGURE 7 is an enlarged side elevation illustrating the "off" position of a right-hand marker device with a second embodiment of a spring loaded overcenter control;

FIGURE 8 is a side elevation of the marker device of FIGURE 7 is an "on" position;

FIGURE 9 is a perspective rear quarter view illustrating a lawn spreader equipped with right-hand and left-hand marker devices with a third embodiment of control mechanism, namely a cable operating system;

FIGURES 10 and 11 are enlarged side elevations of a right-hand cable operated marker device showing, respectively, the "off" and "on" positions;

FIGURE 12 is a perspective view illustrating a modification of the FIGURE 10 marker device wherein the leaf spring mounting is reversed;

FIGURE 13 is a detail view illustrating a pair of hopper operating handles and attachment brackets in mounted position on the handle bars of a spreader;

FIGURE 14 is a detail view illustrating a modified operating handle and bracket assembly on the handle bars of a spreader;

FIGURE 15 is an exploded perspective of one of the bracket and operating lever assemblies of FIGURE 13;

FIGURE 16 is a detail perspective view illustrating the preferred blower unit;

FIGURES 17 and 18 are, respectively, detail side and front elevation views of a modified blower wheel;

FIGURE 19 illustrates a modified form of agitator spring;

FIGURE 20 illustrates a modified form of over-center spring control;

FIGURE 21 illustrates a modified rubber drive wheel; and

FIG. 22 is a sectional view along lines 22—22 of FIG. 21.

Referring now to the drawings, several different embodiments of the basic spreader marker device are disclosed and will be described. The various structural embodiments fall into two methods of operation, (1) foot operated with an overcenter spring and link control (e.g. FIGURE 1), and (2) cable operated with hand lever controls (e.g. FIGURE 9). All embodiments utilize the basic components of a mounting bracket (for example, a substitute spreader leg), an elongate narrow upright hopper pivotally secured on the bracket for pivotal shift about a horizontal axis, a blower assembly at the lower end of the hopper with a drive roller adapted to be moved into drive engagement with the periphery of a spreader tire, and a mechanism enabling selective control of the pivotal position of the hopper.

FIGURE 1 illustrates one presently available form of a lawn spreader 20 to which a right-hand marker 22 and a left-hand marker 24 have been assembled. The exemplary spreader 20 is one which is fully disclosed in co-pending application Serial No. 647,229, filed March 20, 1957, now Patent No. 2,973,884, to which reference may be had for any specific details which may be deemed necessary for a complete understanding of any aspects of this present invention. Applicant is not claiming, in this present application, any inventive aspect of the spreader per se without markers.

The spreader 20 consists of a lateral hopper 26 with side walls 28 and 30 and a lower discharge (not shown) but which consists of a lateral row of discharge openings extending from adjacent one side to adjacent the other side of hopper 26. An adjustable shutter (not shown) located under the discharge openings can be positioned by control lever 32, in conjunction with a rate control mechanism 34, from "full closed" to any desired degree of discharge opening. An axle (not shown) passes through the lower portion of the spreader hopper 26 and has fastened thereto an agitator. The spreader wheels 36 and 38 are secured on the ends of the axle and enable the spreader to be rolled along the ground while discharging material such as fertilizer in a swath substantially the width of the hopper 26.

A tubular spreader handle assembly 40 includes lower forked arms 42, the ends 44 of which are rigidly secured to the associated sides 28 and 30 of hopper 26 by two bolt and nut assemblies 46. As can be seen in the aforementioned co-pending application Serial No. 647,229, now Pat. No. 2,973,884, the basic spreader has a leg secured on each of side walls 28 and 30, the legs being basically similar to the legs 50 and 52 shown in FIGURE 1. Legs 50 and 52 will be described more fully hereinafter in conjunction with the description of the marker devices 22 and 24 but, in the aspect of being constructed of a single sheet metal stamping with a coninuous edge and foot flange, a central reinforcing rib and being secured to a hopper side wall 28 by the same two bolt and nut assemblies 46 which secure the handle end 44 to the hopper side wall 28, are the full equivalent of the original spreader legs of the exemplary spreader 20.

Inasmuch as a line marker, used to visually delineate the edge of the swath of material discharged from a spreader, must deposit marking material along a line below and closely adjacent but slightly inset from the side wall of a spreader, the provision for such a marker device of a mounting bracket attachable to the side wall of a spreader will provide accurate installation alignment for the marker. Proceeding from that premise, and with the knowledge that all manually propelled spreaders need legs to hold them in an upright position when at rest, and with the further knowledge that many of such previously known spreader legs are attached to the sides or edge of the spreader hopper, applicant proposes to utilize a spreader leg 50 and 52 as a combined leg and marker hopper mounting bracket. Alternatively, if the spreader, upon which the marker devices 22 and 24 are to be mounted, has legs secured to the rear wall of the spreader hopper, such original legs could be eliminated or retained. For example, if the rear wall mounted legs are retained, marker devices 22 and 24 could be made with modified brackets having the lower extremities of the legs 50 and 52 removed and they would serve solely as marker device mounting brackets.

As briefly discussed hereinbefore, the reason for having a right-hand marker device 22 and a left-hand marker device 24 on the same spreader 20 is that normal use of a spreader in applying material is to operate it back and forth across a lawn. When operated in such a manner, a marker on one side should be used when going in one direction and when the spreader is turned around to make the trip in the opposite direction, the other side marker should be used. Other than one marker 22 being right-hand and one marker 24 being left-hand, the elements of each are the same and accordingly only the right-hand marker device 22 will be described.

Details of marker 22 are specifically described with reference to FIGURES 4, 5 and 6. As has been described, the hopper bracket 50 also constitutes a leg of the material spreader 20, in actual production practice a spreader leg as disclosed in application Serial No. 647,229 (Patent No. 2,973,884) being modified by provision of drilled or punched holes as will be described.

Both of legs 50 and 52 can be identical, and it will also be noted that the right-hand and left-hand marker devices are made in such a way that all of the sheet metal components can be made from one set of dies, the manner of bending the hopper body components and assembly of the component parts determining the resultant right and left hand nature of the markers. Leg 50 is made of a sheet metal stamping with a central elongate planar portion 54 having a longitudinal rib deformation 56 extending from upper end 58 to a position adjacent lower rounded end 60. Leg portion 54 has a slight convergent taper from its upper end 58 toward lower end 60 (FIGURES 4 and 5). An edge flange 62 extends from a corner of upper end 58 along one side, around the curved end 60 and back along the opposite side to the other corner of end 58 and is of relatively narrow width at upper end 58, becoming progressively wider as rounded end 60 is approached.

Flange 62 and rib deformation 56 provide a high degree of structural rigidity to the sheet metal leg 50 and the cooperative tapering configurations of leg 50, rib 56 and flange 62 enable approximately equivalent strength at both ends of the leg with a relatively wide ground engaging portion of flange 62 at the lower end 60 and a shallow wide attachment portion at upper end 58. Bolt holes 64 are symmetrically located on either side of the longitudinal center line of leg 50 in the wide shallow upper end 58. The shallow symmetrical configuration and planar nature of end 58 enables the legs to be fastened to the spreader in engagement with an associated large flat end portion 44 of the handle assembly fork 42 on hopper side walls 28 or 30 and permits access for assembly or disassembly of the aforementioned bolts and nuts 46.

The rib deformation 56 protrudes from the elongate planar portion 54 of the leg 50 in the same direction as the flange 62 and hence the opposite side of the leg 50, excepting for the indented rib 56, is flat and provides the desired flat support area for pivotally mounted marking hopper 70 and, in the foot operated embodiment, also provides support to mount the resiliently biased over-center control device 72.

Both legs 50 and 52 (see leg 50 in FIGURE 4) have matched right and left sets of holes 74 and 76 which can be drilled or punched when the leg is formed. Only the holes for use in the left hand marker assembly are depicted in FIGURE 4, the corresponding holes for the right hand assembly being occupied by assembled components. One of the upper holes 74 is utilized to receive a rivet 78 which pivotally fastens a rod guide and spring anchor bracket 80 to the upper portion of leg 50, while the corresponding lowermost hole 76 is utilized to receive a rivet 82 which pivotally secures the hopper 70 on leg 50. Thin plastic (nylon) washers 84 and 86 are disposed on respective rivets 78 and 82 between the bracket 80 and the leg surface and between the hopper 70 and the leg surface to enable ease in manipulation of the marker hoppers between the "off" (inoperative) and "on" (operative) positions.

The hopper body is made from two pieces of stamped sheet metal, a trough shaped vertical portion 90, seen in cross-section in FIGURE 4, and a side cover plate 92 (FIGURES 5 and 6) with edges bent at right angles to provide flanges 94 and 96. A series of apertures 98 along the bend line of the side plate flanges 94 and 96 fit over lugs 100 on front wall 102 and rear wall 104 of the trough shaped hopper portion 90, the lugs 100 being bent over in assembly to secure the two parts 90 and 92 in a rigid hopper shape.

The side wall 106 of hopper trough part 90 is flat and is provided with a centrally located hole which receives the hopper pivot rivet 82. Both the front and rear walls 102 and 104 are bent along straight lines to extend at right angles from side wall 106. For the left hand marker hopper the walls 102 and 104 are bent in the opposite direction. The lower extremities 108 and 110 respectively of front wall 102 and rear wall 104 are of constant width while the upper portions of walls 102 and 104 have a constant upward increase in width. Thus when side plate 92 is secured to the trough section 90, a lower, constant width chamber 112 is provided for a material discharge blower unit and the upper portion has a relatively wide top opening 116 and steep, downwardly convergent hopper walls directed into the blower chamber 112.

Journalled between side wall 106 and side plate 92 is the fan or blower rotor 118 (see FIGURE 16). The rotary fan 118 consists of an axle shaft 120 having four radially extending vanes 122, 122', 124 and 124' rigidly secured adjacent one end, ninety degrees apart and parallel with the axis of shaft 120. Vanes 122 and 122' are a single piece of sheet metal bent at right angles with a contoured section 126 at the intersection of the vanes which fits over and is spot welded to shaft 120. The same is true of vanes 124 and 124'. A bearing 128 made of nylon or similar low friction plastic rotatably fits over the extended end 130 of shaft 120 and has a thin annular flange 132 which is disposed between the side edges of vanes 122, 122', 124 and 124' and inner surfaces of the hopper side walls. A similar bearing 134 rotatably fits over the shorter end 136 of the blower shaft 120.

In assembly, the longer end 130 of blower shaft 120 is projected through a hole in the rear wall 106 of hopper portion 90 and the bearing body 138 fits snugly into the rear wall hole. When side plate 92 is secured on hopper portion 90 an aligned hole 140 (FIGURE 2) in the side plate fits over the body 142 of the second bearing 134. The body portions 138 and 142 of bearings 128 and 134 are made with side flats 144 and 144' (see FIGURE 16) which cooperate with straight edges on the bearing mounting holes in hopper wall 106 and side plate 92, as is apparent from FIGURE 2. This construction prevents undesired relative rotation of the bearings in the thin hopper walls, a factor which would result in rapid bearing wear. The annular flanges 132 and 132' of respective bearings 128 and 134 space the blower vane side edges away from the inner surfaces of the blower chamber side walls, and thus axially position the blower fan 118.

Non-rotatably secured on the extended long end 130 of blower shaft 120 is a fan drive wheel 148 made of natural rubber, or the equivalent, molded on a steel hub 150, the steel hub being secured on rod 120 with a set screw 152. The drive wheel 148 is offset a sufficient distance from the hopper 70 so that when the leg bracket 50 is secured to the side wall of a spreader, as in FIGURE 1, the marker blower wheel 148 is aligned with the tread of the rubber tire 154 of spreader wheel 36. Clockwise pivotal movement of the hopper 70 (FIGURE 4) will shift the rubber drive wheel 148 into engagement with the tread of the spreader wheel tire 154, and counterclockwise pivotal movement of hopper 70 moves the drive wheel out of engagement with the spreader wheel tire 154.

The blower drive wheel 148 is rotated by the tire 154 of the associated spreader wheel as the spreader is pushed around the yard, and consequently the blower fan 118 is rotated clockwise (as viewed in FIGURES 2–6) at a high rate of speed due to the extreme step-up ratio between the large circumference of the spreader tire 154 and the small circumference of drive wheel 148. This high speed is desired for blower action, as distinguished from slow speeds required of an agitator type of discharge rotor which do not provide proper discharge of the powdered material used for marking.

A marker hopper discharge plate 160 (FIGURE 4) made from a curved piece of sheet metal is sprung into position between the marker hopper front and rear walls 102 and 104 below the tip path of fan vanes 122 and 124. Small integral lugs 162 and 164 on the end edges of discharge plate 160 fit with respective location slots 166 and 168 in respective front and rear hopper walls 102 and 104 (see FIGURES 4, 5 and 6). The side edges of the discharge plate 160 fit snug against side wall 106 and the inside of side cover plate 92. Inwardly stamped abutments 170 and 172 on side wall 102 and side cover plate 92 engage the approximate mid-portion of the curved exterior of and help to accurately position the discharge plate 160 relative to the path of rotation of the tip edges of the fan vanes 122 and 124. The direction of rotation of the fan is clockwise in FIGURE 4 (indicated by the arrow) and a definite small clearance between the vane edges and the inner surface of discharge plate 160 is provided to enable an air flow around the vane tips. As only a minute quantity of marking dust is required to be discharged, a single row of three discharge holes 174, 175 and 176 has been found to be the optimum for use in markers for hand spreaders. The three discharge holes are located closer to the rear of the hopper than to the front, it having been determined that additional holes forwardly of those shown in FIGURE 4 provided little if any discharge. If the size of the marker device is increased, additional discharge may be required.

The powdered or dust-like nature of the material used for marking requires an agitator 180 to disturb the material above the fan to prevent bridging of the powder around the path of rotation of the vanes. To this end, an agitator 180 made of spring wire has one end 182 secured by a rivet 184 to the upper inside part of marker hopper front wall 102 and its lower end 186 bent into a loop and normally depending into the center of the hopper in the path of rotation of fan vanes 122 and 124. Rotation of the rotor 118 and the vanes 122 and 124 successively past the depending looped end 186 causes a vibratory flexing of the spring wire agitator 180, disturbing the material above the fan and prevents bridging above the blower rotor. In some instances, particularly if the marker hopper is completely filled, a second loop 188 (FIGURE 19) at an intermediate location on the spring wire agitator 180' in addition to the lower loop 186' is adavantageous.

When the marker is not being used hopper 90 is pivotally shifted on its mounting rivet 82 to the "off" position shown in FIGURES 3 and 4, at which position the front hopper wall 102 abuts and its pivotal shift is limited by the overcenter mechanism bracket 80. In this "off" position, the drive wheel 148 is shifted to a position rearwardly of driving engagement with the spreader wheel tire. The hopper 90 is resiliently biased by overcenter device 72 to whichever of the two positions "on" or "off" it is placed in by the operator. To pivot the hopper 90 to its "off" position a curved plate abutment 190 for engagement by the operator's foot in a forward direction, is secured by spot welding to the upper edge of the hopper rear wall 104. To pivot the hopper 90 to its "on" position a foot bracket 192 made from a V-shaped piece of strap iron is rigidly fastened approximately midway between the upper and lower ends of the hopper rear wall 104. Viewing FIGURE 4, it will be understood that a downward force on foot bracket 192 will pivot the hopper in a clockwise movement until the rotor drive wheel 148 engages with and is maintained against the spreader wheel tire by the biasing force of the overcenter mechanism 72.

Overcenter mechanism 72 includes the U-shaped bracket 80, the bight of which is pivotally secured to leg 50 by rivet 82, while the two bracket ears 194 and 196 extend away from the leg 50 into the pivotal path of movement of hopper 90 to serve as the aforenoted abutment limit stop for the hopper "off" position.

The two ears 194 and 196 of pivoted bracket 80 are parallel and both are apertured to slidably receive one leg 197 of an L-shaped connecting rod 198, the other end 199 of which pivotally fits through apertures in two ears 200 and 202 of a second U-shaped bracket 204 rigidly fixed to the marker hopper front wall 102 as by spot welds. A strong compression coil spring 206 is located around the slidable leg 197 of rod 198 between the ears 194 and 196 of pivoted bracket 80 and maintains a compression biasing force tending to force rod 198 downwardly by virtue of one of the spring ends abutting the inner side of upper bracket ear 194 and the other end abutting a cotter pin 208 located in a suitable hole in the rod 198. If desired a washer 210 can be placed between the spring end and the cotter pin 208.

The spring loaded connecting rod 198 being biased downwardly creates a force, through the pivotal connection of its bent end 199 in fixed bracket 204, on the marker hopper 90 and, depending upon the position of the axis of pivoted rod end 199 to one side or the other of the line between the pivot axes of bracket pivot rivet 78 and the hopper pivot rivet 82, will urge the marker hopper 90 in a clockwise or a counterclockwise direction. In the "off" position (FIGURES 2 and 4) the spring loaded rod urges the hopper counterclockwise to maintain it in abutment with the bracket 80. When an operator presses, with his foot, on the V-shaped bracket 192 the hopper 90 is moved in a clockwise direction about its pivot rivet 82 causing the connecting rod 198 to move upward and swing counterclockwise about the bracket pivot rivet 78. Spring 206 undergoes compression during this movement until the pivot axis of the lower leg 199 of rod 198 moves to and past a dead center position on the line between the axes of the two pivot rivets 78 and 82, and as the lower leg 199 of rod 198 passes over the dead center position, the direction of force of the compression spring 206 shifts to act in a clockwise direction on hopper 90 (see FIGURE 3).

Just beyond the dead center position the rubber drive wheel 148 engages the periphery of the spreader tire 154. The resilient nature of the live rubber drive wheel and its concave periphery (see FIGURES 5 and 6) enables a distortion of the drive wheel (see FIGURE 8) to make a relatively large area high friction contact with the spreader wheel tire 154 and providing a squeegee action between the two wheels and maintaining a good dependabl driving engagement.

In moving the marker hopper back to an "off" position, by forward pressure of the operator's foot on the curved plate 190, the movement of the connecting rod 198 back overcenter is the reverse of that just described.

An alternative arrangement of an overcenter biasing spring mechanism is shown in FIGURE 20 where a lever 220 is pivoted intermediate its ends on a spreader leg 222 (or bracket). A hopper 224 is also pivoted on leg 222 below the lever 220 and carries a forked bracket 226 fixedly secured on its front wall. The fork of bracket 226 engages a pin 228 secured in the lower end of lever 220. The upper end of lever 220 anchors one end of a tension coil spring 230, the opposite end of which is anchored to an end 232 of a bracket 234 secured to the leg 222. The "off" position shown in FIGURE 20 is determined by abutment of the forked bracket 226 against the body of spring anchor bracket 234 at which position the line of force of the tension spring is offset to the left of the line through the pivot axis of lever 220 and the lever anchored end of the spring 230. This arrangement resiliently biases the lever 220 counterclockwise tending to maintain the forked bracket 226 of hopper 224 against the anchor bracket. Hopper 224 can be moved counterclockwise about its pivot by foot pressure on the V-shaped bracket 192', as in the previously described embodiment, which movement will shift the forked bracket 226 to the left, moving the pivoted lever 220, by means of pin 228, clockwise to shift the line of force of spring 230 until it passes overcenter and resiliently urges the pivoted lever 220 in a clockwise direction to force the hopper rotor drive wheel against the spreader wheel.

FIGURES 7 and 8 illustrate a still further embodiment of an overcenter marker hopper control. In this instance two leaf springs 238 and 240 are rigidly fastened adjacent one of their ends to the flange 242 of a spreader leg 244, adjacent the location of a pivot rivet 245 by which a marker hopper 246, similar to previously described hopper 90, is pivotally mounted on the spreader leg. A dog leg operating lever 248 is pivotally mounted on the upper portion of the hopper side wall and has an operating knob 250 on one end and a laterally bent flat finger 252 on its other end. The lever finger 252 projects laterally between and is engaged by the two adjacent leaf springs 238 and 240, the resilient nature of which, as shown in FIGURE 7, tends to maintain the hopper 246 in its "off" position with the rotor drive wheel 254 away from engagement with the tire periphery of the spreader wheel 256.

Downward pressure on the lever knob 250 by the operator's foot will cause the lever lip 252 to shift clockwise, flexing the forward leaf spring 238 which reacts with a bias force through the lever 248 on the upper end of hopper 246 causing the hopper to pivot clockwise which places the drive wheel 254 firmly against the spreader wheel 256. Continued pivoting of lever 248 moves the lower edge of lip 252 up along leaf spring 238 until the lever lip 252 engages the bent end 258 of spring 238 (FIGURE 8). Such engagement is an effective lever limit stop and in this position the force of spring 238 on lever lip 252 is in a line passing over the pivotal axis of lever 248, thus exerting a clockwise bias force on the lever which detains the lever 248 and hopper 246 in a spring loaded "on" position. The operator can shift the hopper 246 to its "off" position by using his toe to lift the lever knob 250 from its position depicted in FIGURE 8 until the line of spring force on lever lip 252 passes below the pivotal axis of lever 248, at which point the hopper will move under spring bias to the "off" position depicted in FIGURE 7.

FIGURES 17 and 18 illustrate a modified blower fan 260 with inclined vanes 262. Although satisfactory to provide the blowing force under certain conditions and with some coarser types of marking material, this embodiment does not have the more universal acceptability of performance which is obtained with a fan having radial vanes parallel to the fan shaft axis as are the fan vanes 122 and 124 in FIGURE 16.

*Hand Lever Operated Embodiment*

With reference to FIGURES 9-15, an alternative way of turning the marker devices "on" and "off" will be described. All components of the hopper, plus its rotor, drive wheel and its pivotal attachment to a spreader leg are similar to the same components of the aforedescribed marker devices, and hence need not be again described. The only difference is in the method of moving and maintaining the marker to and in its "off" and "on" positions. This hand lever operated embodiment uses a cable or chain, preferably a plastic coated steel stranded flexible cable 270 which is connected by a rivet 272 at the top of a marker hopper 274 and has its other end secured either to the handle of the spreader or to a control lever adjacent the spreader handle. Each hopper is biased by a leaf spring 276 to an "off" position. The marker can then be controlled to "on" and "off" positions at will by applying pressure, either through a lever on the handle or by the operator's grabbing the cable and pulling it against spring bias. This arrangement will enable application of a marking line of any length so long as tension is maintained on the cable. When cable tension is released, the marker returns to the "off" position under spring bias. This makes possible marking a lawn every 4 or 5 feet, thereby resulting in a dotted line effect and conserving material or in making a continuous line, as desired by the operator. The advantage is obvious in that it conserves marking material if the line is not continuous and gives the operator a means of controlling the device from the handle rather than using his foot or shoe to turn the device "on" and "off." It also eliminates much of the costly assembly of the overcenter spring mechanism which in turn eliminates the necessity of holding very close tolerances in assembly which are required in order to assure proper spring tension in both the "on" and "off" position by an overcenter travel device.

Shown in FIGURE 10 the marker hopper 274 is pivotally mounted on an associated spreader leg 278 by a pivot rivet 280 in the same manner as described for hopper 90. The rivet 272 which secures the end of cable 270 to the marker hopper is located near the top edge of the hopper front wall. Bias force to urge the hopper 274 counterclockwise (FIGURE 10) about its pivot rivet 280 is provided by a leaf spring 276 one end of which is fastened to the edge flange 284 of leg 278 by suitable means such as the bolt and nut unit 286.

Leaf spring 276 rests against a post 288, which can be the extended shank of a bolt passed through the hopper wall. The head of the bolt will bear against the inner surface of the hopper side wall and one or two nuts 290 are used to lock the bolt in position. The "off" limit position can be determined by abutment of the rotor axle 292 against the leg 278 or by the length of the cable 270 which, when taut, will limit the spring biased hopper movement. When cable 270 is pulled toward the spreader handle, the marker hopper will pivot clockwise forcing the stud 288 to abut and stress the leaf spring 276 (FIGURE 11) and shifting the rubber drive wheel 294 forwardly to be pressed against the tire periphery of the spreader wheel 296 to be rotated and cause discharge of the marking material.

An alternative mounting of the spring leaf and spring engaging stud is illustrated in the perspective view of FIGURE 12. In this embodiment the leaf spring 276' has an upper end bent lip 277 which embraces the upper front edge of the marker hopper 274'. A stud 288', in this instance, is secured on the spreader leg 278' and projects between the spring leaf 276' and the hopper 274'. Engagement between the hopper front wall and stud 288' will determine the "off" position of the marker. The upper lip 277 of spring 276' disposed over the top edge of hopper 274' in cooperation with a fastening bolt 279 at the top end of the spring leaf 276' will maintain the vertical disposition of the leaf 276'.

The upper end of the control cable 270 can either be looped around the spreader handle bars 296 and 298 or suitable individual right and left hand auxiliary levers, as shown in FIGURES 13 and 14, can be provided for convenient hand gripping action enabling individual control of the right and left hand markers.

FIGURE 13 illustrates the preferred control lever embodiment in which the two lever assemblies 300 and 300' are identical. The components of a lever assembly 300 are made of sheet metal stampings, shown in exploded perspective in FIGURE 15. The mounting bracket 302 is stamped into a cup-shaped component with integral clamping straps 304 and 306. The cup shaped body of bracket 302 has end walls 308 and 310 disposed at an approximately ninety degree angle to each other and connected through smoothly curved transitions with integral side walls 312 and 314. The bottom of the cup is punched out leaving an aperture 316 into which the large end 318 of a tapered, stamped sheet metal lever 320 is inserted. Tapered lever 320 is channel shaped and at the large ends of the side flanges has coaxial holes 326 and 326'. When the lever 320 is assembled into the bracket cup 302 the two holes 326 and 326' are coaxially aligned with a second set of two holes 328 and 328' in the cup side walls 312 and 314. A rivet 330 projects through all holes, and is secured by swaging its end, to pivotally mount the lever 320 in the bracket cup 302. As disclosed in the break-away view of FIGURE 13, abutment of the bottom of lever 320 against the end wall 310 can be used to determine one of its control limit positions, i.e., the "off" position. A second rivet 332 also passes through and strengthens the cup side walls preventing spreading of the walls away from parallel disposition.

Adjacent both ends of the cup side wall 314, the aforementioned integral metal clamping straps 304 and 306 may be found. These straps are both curved and provided with respective terminal bent tabs 334 and 336. At the corresponding ends of the other cup side wall 312 are two integral outwardly bent tabs 338 and 340. Corresponding tabs 334 and 338 and tabs 336 and 340 have holes formed therein to receive bolts 342 (FIGURE 13) which, with associated nuts, securely clamp the bracket 302 on the bends 344 or 345 of the handle bar tube in the manner of C-clamps. The upper edges 346 and 347 of the two end walls 308 and 310 have a concave curvature to enable close abutment against the under surface of the cylindrical handle bar tube while the upper edges 348 and 350 of the side walls 312 and 314 are curved in a convex manner to conform to the bend curvature along the side of the associated bends 344 or 345 of the handle bar tubes. By having the two parallel side walls 312 and 314 spaced apart a distance slightly less than the diameter of the handle bar tube, cooperation between the convex edges 348 and 350 and the handle bar tube, together with the tightened clamp straps 304 and 306 will effectively lock the lever assembly 300 at a desired location on the band 344 or 345 of the handle bar tube.

The small end of lever 320 terminates in an apertured tongue 352, the hole 354, in which, enables passage of the upper end of the plastic coated cable 270. A metal collar 356 is adjustably fastened on the end of cable 270 above the lever tongue 352 by a set screw 358 and provides a stop member on the end of the cable by which the cable 270 can be pulled when lever 320 is pivoted toward the handle bar grips 360 by a squeeze of the operator's hand. Other suitable fastening means can be used to adjustably secure the flexible cables 270 and 270' to levers 320 and 320', e.g. the lever flanges 320 and 322 can be apertured as in FIGURE 15 and the cable laced back and forth through the apertures.

FIGURE 14 illustrates a modified operating lever assembly 368 of more expensive construction than the simple sheet metal stampings which form the lever assemblies 300 of FIGURE 13. Two complementary stamped plates 370 are contoured to fit over the converging handle bar tubes 372 and 372' and are clamped thereto by screws 374. The operating levers 376 and 376' are short lengths of small diameter steel tube pivoted between ears 378 of the front and back plates 370 by bolts 380. Indentations 382 in plates 370 adjacent ears 378 serve as a limit stop abutment to determine the "off" position of control lever 376. In this embodiment, the upper end of the flexible marker hopper cable 384 is passed through holes in the end of lever tube 376 and a rubber or the like grip 386 slipped over the end of tube 376 to anchor the cable. Since the upper end of the cable 384 is fixed, the lower end must be made adjustable and such adjustability can very easily be accomplished by passing the cable through a hole in the hopper wall and fastening a collar similar to collar 356 on its end.

Although the lever assembly 300 of FIGURE 13 is a preferred construction from a viewpoint of economy, both lever assemblies 300 and 368 operate in the same manner, i.e. in the "off" position, as illustrated in FIGURES 13 and 14 the cable permits the hopper 274 (FIGURE 10) to assume its "off" position, whereas when the lever 320 (or 376) is pivoted toward the handle bar grip the cable will pull the hopper clockwise to an "on" position as in FIGURE 11 where the rotor is operative during movement of the spreader and the marking material is discharged onto the ground or the grass blades.

It is essential that the clearances between the blower vanes and the discharge holes in the bottom of the marker be closely held since it is the fast speed of the agitator rotor and air passing off the vane tips which blows the material out of the discharge holes to accomplish the proper marking job.

For best results, discharge holes 174, 175 and 176 (FIGURE 4) must be spaced so that they are in a position to take advatage of the downward stroke of the fan vanes 122, 124 for maximum force feed.

The spring-type wire vibrator 180 must be so designed so that the spreader can be moved in either direction without the lower end loop 186 locking and so that the spring wire tension is not great enough to cause the drive wheel 148 of the marker to slip on the spreader wheel, yet provides enough vibration to constantly agitate the marking material within the hopper, keeping it from bridging and thereby enabling continuous feeding of the material down to the vaned rotor 118.

Nylon bearings are utilized so that rust and corrosion are eliminated to enable a long life free movement of the rotor within the marker hopper. The nylon thrust washer bearing located between the marker hopper and the leg prevents the body of marker from rubbing against the side of the leg, and thereby facilitates maximum spring tension being applied against the hopper to hold the drive wheel firmly against the spreader wheel.

The marker drive wheel, particularly for the foot operated continuous marker modifications, is made of natural rubber with a concave surface, and a proper amount of spring tension or lever biasing force tends to flatten this concave curvature out, thereby providing a squeegee action cleaning the marker drive wheel of water and any accumulation of dust or powder which would otherwise cause slippage and make the marker inoperative.

A modified rubber squeegee wheel with embedded steel tines (see FIGURES 21 and 22) will serve as a universal drive wheel for use with the continuous, foot applied marker embodiment and with the lever embodiment. In addition to having the squeegee action of the rubber drive wheel 148 (see FIGURE 16), the rubber drive wheel embodiment 148' with hub 150' illustrated in FIGURES 21 and 22 will provide an improved drive action because of hardened steel tines 149 being molded into the rubber wheel 148' to give better overall traction even on wet, slippery surfaces. When the spreader wheel has sufficient moisture on it that the squeegee action of the rubber drive wheel 148' is effective, the spreader wheel will be kept wiped clean of material. In instances where there is not enough moisture for this squeegee action to be 100% effective, then the tines 149 as shown in FIGURES 21 and 22 give an added gripping action since the more pressure or squeegee action applied to the marker drive wheel 148', the further these tines 149 extrude and grip the spreader wheel. The flexing of the rubber wheel 148' in combination with the tines 149 also tends to break up any crusting or coating of mud that might be picked up on the marker drive wheel 148'.

When using the lever operated marker embodiment the projected tines 149 on marker drive wheel 148' will actually tend to cut through any layer of mud which may form on the spreader wheels and thereby provide an action tending to break-up and knock the mud off of the spreader wheels better than will the wholly rubber drive wheels 148, so long as the application by lever action is spasmodic or at intervals. During intermittent lever operation, it is the hitting and small degree of relative shift of the tines and the forcing of them into the spreader wheel tire on an intermittent basis which helps keep the spreader wheel and the drive wheel clear of mud and other material.

The foregoing is a complete description of a marking device for use with material dispensing lawn spreaders. The marking device may be used on the right and left side of conventional spreaders and the mounting bracket of the marking device preferably is the leg of a spreader mounted on the side wall of the spreader. Foot operated markers with overcenter spring biasing controls for both "off" and "on" positions and hand lever operated marker devices, spring biased to an "off" position, are included within the confines of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A selectively operable line marker, for use in combination with lawn spreaders having ground engaging wheels, comprising: a bracket device adapted to be secured to the lawn spreader and having a vertically planar portion; a hopper with a bottom discharge opening; a material discharge mechanism carried by said hopper including a rotatable drive means adapted upon selective positioning to engage and be driven by a wheel of the spreader; means securing said hopper to said vertically planar bracket device portion for pivotal shifting movement of said hopper about a horizontal axis; control means, including a resilient biasing device connected between said bracket and said hopper to selectively pivotally shift said hopper between operative and inoperative discharge positions.

2. A line marker as defined in claim 1, wherein said bracket device is a vertically planar elongate sheet metal stamping with a flange along its side and curved around one end to form a foot and said bracket is adapted to be secured to a side wall of the hopper of the spreader and serves as a spreader support leg as well as the marker hopper support.

3. In a selectively operable line marker as defined in claim 1, said rotatable drive means including a drive wheel which upon selective pivotal shift of said hopper will be positioned in engagement with a wheel of said spreader, said drive wheel comprising a hub, a resilient flexible material wheel means on said hub, the annular outer peripheral portion of said wheel means having a transverse concavity, and a plurality of elongate metal tines molded in said wheel means at spaced locations circumferentially around the axis of said wheels and at least a portion of said tines projecting exterially of said wheel means in said concave periphery.

4. In a selectively operable line marker as defined in claim 1, said rotatable drive means including a drive wheel which upon selective pivoted shift of said hopper will be positioned in engagement with a wheel of said spreader, said drive wheel comprising a wheel body with protrusion means projecting at circumferentially spaced positions around the outer periphery of the drive wheel.

5. A line marker as defined in claim 1, wherein said control means includes at least one abutment device secured to said hopper and adapted to be engaged by a spreader operator to pivotally shift the hopper in one direction or the other, and said resilient biasing device comprises a pivotable overcenter linkage mechanism adapted to be shifted in both directions past a dead center condition to resiliently bias the hopper in either position toward which it is selectively positioned.

6. A line marker as defined in claim 1, wherein said control means includes a spring connected between said hopper and said bracket to urge said hopper toward an inoperative position, and a pull device connected to said hopper for shifting the hopper in opposition to said resilient biasing force to an operative position.

7. A line marker as defined in claim 1, wherein said material discharge mechanism includes: a narrow chamber provided by the lower end of said marker hopper and a curved bottom plate having a plurality of material discharge holes therethrough, and a rotary mechanism comprising a shaft rotatably journalled in the marker hopper walls above said bottom plate, a vaned rotor rigidly fixed on said shaft within said chamber above said bottom plate, and a resilient drive wheel, the periphery of which has a high coefficient of friction, non-rotatably secured to said shaft and disposed exterior of said marker hopper.

8. A line marker as defined in claim 7 wherein separate bearing members are disposed between said hopper and said bracket at said pivotal mounting means and at two spaced apart locations in the walls of said hopper chamber on said shaft on either side of said vane rotor, at least the two bearing members on said shaft being made from a low friction, high wear plastic for corrosion resistance.

9. A line marker as defined in claim 7, wherein said material discharge mechanism further includes a vibrator mechanism disposed within said hopper above said shaft and actuated by rotation of said rotary mechanism.

10. A line marker as defined in claim 9, wherein said vibrator mechanism comprises a spring wire secured at one end to an upper portion of said marker hopper and depending in a spaced relationship from the inner surfaces of said marker hopper and with its other end disposed into the rotary path of the vanes of said rotor, said spring wire including at least one enlarged area.

11. A line marker as defined in claim 8 wherein said shaft bearing members include an annular flange disposed between the side edges of said vanes and the adjacent marker hopper walls and a non-cylindrical body portion, the hopper walls having non-cylindrical holes matching and receiving the non-cylindrical body portions of said shaft bearings to maintain said shaft bearings non-rotatable relative to said hopper walls.

12. In combination with a material distribution spreader having a lateral hopper with side walls, a laterally disposed material discharge structure between said side walls at the bottom of said spreader hopper and two ground engaging spreader support wheels adjacent said side walls, two spreader discharge path edge marking devices, each one being adapted to discharge material to mark the ground at an associated edge of the lateral extent of material discharged from said spreader hopper, each marking device comprising a bracket, a hopper with a bottom discharge, a marking material discharge mechanism carried by the marker hopper including an external drive wheel, means pivotally securing said marker hopper to said bracket on a horizontal lateral axis, and control means adapted to selectively pivotally shift said marker hopper on its pivotal mount between an operative and an inoperative position; means securing the two said marking device brackets on opposite sides of said spreader hopper so the bottom discharge of the associated marker hopper will be positioned to swing in limited arcs aligned behind the associated edges of the spreader hopper lateral discharge and the associated marking device drive wheels will be positioned to be selectively moved into driving engagement with associated spreader wheels upon selective shift of the associated marker hopper to an operative position.

13. In the combination defined in claim 12, each of said brackets being formed as a spreader support leg and a said bracket leg is secured to each side wall of said spreader hopper.

14. In the combination defined in claim 12, the control means for each marking device comprising a resiliently biased overcenter linkage adapted to resiliently bias the marker hopper in whichever of the inoperative or operative positions the marker hopper is shifted.

15. In the combination defined in claim 12, the spreader having handle bars and the control means for each marking device comprising a cable having one end connected to an upper portion of said associated hopper, means connecting the other end of said cable to a position adjacent said spreader handle bars and spring means connecting between the associated marker hopper and its associated bracket biasing the upper portion of the associated marker hopper in a direction away from said handle bars to the hopper inoperative position.

16. The material spreader and marking device combination as defined in claim 15 wherein said handle bars have dual lateral gripping portions, the means connecting the control cables of both marking devices to the spreader handle bars comprises a lever mechanism with dual control levers and means securing said dual levers to the central portions of said handle bars so a control lever is disposed alongside each lateral handle bar gripping portion, and said control cables are respectively secured to separate ones of said control levers so that independent movement of said control levers will control operative and inoperative positioning of an associated marking device.

17. The combination as defined in claim 16, wherein said lever mechanism comprises two identical separate lever assemblies, each comprising a cup-shaped bracket with an opening in its base and integral clamping straps and lugs on the walls of said bracket, an elongate member having one end apertured and disposed through the bracket opening into the interior of said cup-shaped bracket, a rod member secured in the walls of said cup-shaped bracket and passing through said apertured end of and pivotally mounting said elongate member in said bracket, and means adjacent the other end of said elongate member enabling an end of an associated control cable to be secured thereto.

18. A marking device cable control lever assembly, for attachment to a handle bar of a material distribution spreader, comprising a cup-shaped bracket with an opening in its base and integral clamping straps and lugs on the walls of said bracket, an elongate member having one end apertured and disposed through the bracket opening into the interior of said cup-shaped bracket, a rod member secured in the walls of said cup-shaped bracket and passing through said apertured end of and pivotally mounting said elongate member in said bracket, and means adjacent the other end of said elongate member enabling an end of an associated control cable to be secured thereto.

19. A lawn spreader marker device comprising a stamped sheet metal spreader leg with a flat portion adapted to be vertically disposed when the leg is secured on a spreader; a marker hopper comprising: a single piece trough portion with a side wall, a front wall, a rear wall, open upper and lower ends, and apertures in the lower portions of said front and rear walls; means pivotally securing a mid-portion of said side wall to the flat portion of said leg; a side plate with bent edge flanges along opposed front and rear edges fitted over the front and rear walls of said trough to form a hopper with open upper and lower ends; a curved bottom discharge plate, with a series of holes therein and lugs on each end, sprung into position between said front and rear walls with said lugs interlocking into respective ones of said front and rear wall apertures; a shaft extending through said side wall and said side plate above said discharge plate, a plurality of vanes rigidly secured to said shaft extending radially outward parallel to the axis of said shaft and having tip edges which, upon rotation of said shaft, pass closely adjacent to but spaced away from the surface of said discharge plate; plastic bearing means, non-rotatably secured in said side wall and said side plate, rotatably journalling said shaft and coacting with said vanes to axially position said shaft in said hopper; and a live rubber wheel with a concave peripheral surface non-rotatably secured to one of the ends of said shaft exterior of said hopper.

20. A marker device as defined in claim 19 wherein a spring wire agitator is secured at one of its ends near the top of said hopper and depends intermediate the hopper walls so its lower end is normally disposed into the path of rotation of said vanes, said lower end being engaged and flexed out of the path of vane rotation by each vane as it rotates to provide a vibratory flexing of said spring wire.

21. A selectively operable line marker device in combination with a material distribution spreader having ground engaging wheels comprising: a hopper with a bottom discharge opening; support means mounting said hopper and secured to said spreader adjacent one of said wheels; a material discharge mechanism carried by said hopper including a rotatable drive means adapted upon selective positioning of said hopper relative to said spreader to engage and be driven by a wheel of the spreader; said support means enabling pivotal shifting movement of said hopper about a horizontal axis and including means connected between said spreader and said hopper to enable selective pivotal shift of said hopper between operative and inoperative discharge positions and to maintain said hopper in selected position.

22. A selectively operable line marker, for use in combination with material distributing spreaders having ground engaging wheels, comprising: a hopper with a bottom discharge opening; a planar bracket means secured to said hopper and adapted to be secured to a spreader in substantially vertical disposition; a material discharge mechanism carried by said hopper adjacent said bottom discharge opening and including a rotatable drive means adapted upon selective positioning to engage and be driven by a wheel of the spreader; means including said planar bracket means enabling pivotal shifting movement of said hopper about a horizontal axis to permit selective positioning when secured to a spreader; and means on said bracket means to maintain selective positioning.

23. A selectively operable line marker, for use in combination with material spreaders having ground engaging wheels, comprising: a hopper with a bottom discharge opening; a material discharge mechanism carried by said hopper adjacent said discharge opening including a curved bottom plate inside of said hopper which with the lower end of said marker hopper forms a narrow chamber and a rotary mechanism comprising a shaft rotatably journalled in the marker hopper walls above said bottom plate, a vaned rotor rigidly fixed on said shaft within said chamber above said bottom plate, and a resilient drive wheel non-rotatably secured to said shaft and disposed exterior of said marker hopper; said bottom plate having a plurality of material discharge holes therethrough.

24. A line marker as defined in claim 23, wherein said material discharge mechanism further includes a vibrator mechanism disposed within said hopper above said shaft and actuated by rotation of said rotary mechanism.

25. A line marker as defined in claim 24, wherein said vibrator mechanism comprises a spring wire, means securing one end of said spring wire to an upper portion of said marker hopper with the wire depending in a spaced relationship from the inner surfaces of said marker hopper and with its other end disposed into the rotary path of the vanes of said rotor, said spring wire including at least one enlarged area provided by a bend in said wire.

26. A marking device cable control lever assembly, for attachment to a handle bar of a material distribution spreader, comprising: a cup-shaped bracket having a base with an opening therein, two end walls diverging from said opening and terminating in concave edges, two approximately parallel side walls integral with said end walls and having convex edges extending between said concave end wall edges, at least one clamping strap extending from one of said side wall edges and terminating in an apertured lip and an integral apertured lug extending from the opposite side wall edge in opposed relationship to said apertured lip whereby a bolt and nut assembly can secure said lip and said lug together for tightening purposes; an elongate member having one end apertured and disposed through said bracket opening into the interior of said cup-shaped bracket; a rod member secured in the walls of said cup-shaped bracket and passing through said apertured end of and pivotally mounting said elongate member in said bracket; and means adjacent the other end of said elongate member enabling an end of an associated control cable to be secured thereto.

27. A lawn spreader having a lateral type wheeled hopper with rearwardly disposed support legs, right and left hand marker devices on said spreader each said marker device including a hopper with a blower type discharge mechanism and selective control mechanism including means shiftably securing said hopper on an associated spreader leg enabling drive engagement between its discharge mechanism and a spreader wheel for independent selective discharge control of marking material from either device.

28. A lawn spreader having a lateral wheeled hopper with a wheel at each side of the hopper and with rearwardly disposed support legs, independent right and left hand powdered material dispensing marker devices secured adjacent respective right and left hand sides of said spreader hopper, each marker device including a driven means for effecting dispensing of powdered marking material and independent selective control mechanism enabling direct drive engagement of the associated driven means and the spreader wheel located at the hopper side adjacent the respective marker device for effecting independent selective discharge control of marking material from either device.

29. A lawn spreader having a lateral type wheeled hopper with rearwardly disposed support legs, at least one powder dispensing marker device including a driven means for effecting dispensing of powdered marking material mounted adjacent one side of said wheeled hopper including selective positioning mechanism for moving said device so that said driven means is moved into and away from direct drive engagement with a spreader wheel to thereby selectively control operation of said device to dispense powdered marking material.

References Cited in the file of this patent

UNITED STATES PATENTS

| | | |
|---|---|---|
| 289,368 | Osborne | Nov. 27, 1883 |
| 486,585 | Meier | Nov. 22, 1892 |
| 644,442 | McElroy | Feb. 27, 1900 |
| 1,191,116 | Schippell | July 11, 1916 |
| 1,515,987 | Allison | Nov. 18, 1924 |
| 1,606,949 | Litchfield | Nov. 16, 1926 |
| 1,876,409 | Gordon | Sept. 6, 1932 |
| 1,965,483 | Woods | July 3, 1934 |
| 2,086,673 | Johnson | July 13, 1937 |
| 2,520,680 | Hamilton | Aug. 29, 1950 |
| 2,561,008 | Burrows et al. | July 17, 1951 |
| 2,728,492 | Fox | Dec. 27, 1955 |
| 2,833,542 | Martin | May 6, 1958 |
| 2,839,222 | Thelander | June 17, 1958 |
| 3,019,470 | Romeo | Feb. 6, 1962 |

FOREIGN PATENTS

| | | |
|---|---|---|
| 867,765 | Germany | Feb. 19, 1953 |
| 276,150 | Great Britain | Aug. 25, 1927 |